United States Patent
Goyal

(10) Patent No.: US 7,231,353 B1
(45) Date of Patent: Jun. 12, 2007

(54) SYSTEM AND METHOD FOR RECORDING AND REPORTING CONSUMER MONETARY COMMENTARY

(75) Inventor: Anil K. Goyal, Port St. Lucie, FL (US)

(73) Assignee: Infoshop LLC, Fort Pierce, FL (US)

( * ) Notice: Subject to any disclaimer, the term of this patent is extended or adjusted under 35 U.S.C. 154(b) by 500 days.

(21) Appl. No.: 09/651,680

(22) Filed: Aug. 30, 2000

Related U.S. Application Data

(60) Provisional application No. 60/217,980, filed on Jul. 13, 2000.

(51) Int. Cl.
*G06Q 99/00* (2006.01)
(52) U.S. Cl. .............. 705/1; 705/10; 705/26; 705/40
(58) Field of Classification Search ............ 707/1, 707/3, 102; 705/30, 14, 26, 35, 50, 38, 1, 705/37, 58, 8, 11, 53, 400, 10; 345/751; 379/93.12; 101/91; 709/203, 206, 223
See application file for complete search history.

(56) References Cited

U.S. PATENT DOCUMENTS

| | | | |
|---|---|---|---|
| 5,867,799 A * | 2/1999 | Lang et al. ............... | 707/1 |
| 5,895,450 A * | 4/1999 | Sloo ............... | 705/1 |
| 6,038,554 A * | 3/2000 | Vig ............... | 705/400 |
| 6,223,165 B1* | 4/2001 | Lauffer ............... | 705/8 |
| 6,493,703 B1* | 12/2002 | Knight et al. ............... | 707/3 |
| 6,574,608 B1* | 6/2003 | Dahod et al. ............... | 705/26 |
| 6,711,581 B2* | 3/2004 | Rebane ............... | 707/102 |
| 6,839,690 B1* | 1/2005 | Foth et al. ............... | 705/53 |
| 6,865,261 B1* | 3/2005 | Rao et al. ............... | 379/93.12 |
| 2001/0032170 A1* | 10/2001 | Sheth ............... | 705/37 |
| 2001/0039508 A1* | 11/2001 | Naglar et al. ............... | 705/11 |

(Continued)

FOREIGN PATENT DOCUMENTS

FR 2572209 A1 * 4/1986

(Continued)

OTHER PUBLICATIONS

Ishman,M.Computer Crimes and the Respondeat Superior Doctrine: Employers Beware! Article.Spring 2000, [Retr. Sep. 29, 2003] Retrieved from Internet. URL: <http://www.ishmanlaw.com/resources/Respondeat_Superior.pdf>, <http://www.bu.edu/law/scitech/OLJ6.htm>.*

(Continued)

*Primary Examiner*—C. Luke Gilligan
*Assistant Examiner*—Natalie A. Pass
(74) *Attorney, Agent, or Firm*—George C. Rondeau, Jr.; Davis Wirght Tremaine LLP

(57) ABSTRACT

A technique allows users to provide commentary by making monetary payments to a service provider who then publicly displays the company, product, or service's monetary commentary in an organized manner. In a computer implementation, a user selects a positive or negative rating category and can make a credit card payment to a service provider to thereby provide commentary on a particular business entity, organization, product, service, individual person, geographical location, or the like. The individual may also retrieve data to determine how other users have built the reputation up or down for a selected category. The amount of money provided in the positive or negative rating category is generally indicative of the individual satisfaction/dissatisfaction with an entity and is a public expression of that user's reaction.

1 Claim, 8 Drawing Sheets

U.S. PATENT DOCUMENTS

2002/0138402 A1* 9/2002 Zacharia et al. ............... 705/37

OTHER PUBLICATIONS

Ott. C. For Your Information article. Aug. 3, 1999. [Retr. Sep. 29, 2003]. Retrieved from Internet. URL: <http://archive.salon.com/tech/feature/1999/08/03/info_markets/print.html>.*

Bell, B.A. Dealing with False Internet Rumors: A Corporate Primer. 1999.FindLaw Library.[Retr.Sep. 29, 2003]. Retr. from Internet. URL: <http://library.lp.findlaw.com/articles/file/00347/006493/title/subject/topic/science%20%20technology%20law_internet>.*

Internet & theOnline Investor:SEC Educational Efforts& Enforcement Activities.Securities in the Electronic Age. Glasser LegalWorks.2000.Pitt et al.[Retrieved Apr. 7, 2004]. Retrieved fr.Internet.URL: <http://www.dgslaw.com/articles/317470.html>.*

Bell, B. Dealing with the "Cybersmear." Apr. 1999 New York Law Journal. [Retrieved on Sep. 20, 2004]. Retrieved from Internet. URL: <http://www6.law.com/ny/tech/041999t3.htm>.*

Ishman, M. Spring 2000. Computer Crimes and the Respondeat Superior Doctrine: Employers Beware!, {Retrieved on Sep. 20, 2004]. Retr from Internet. URL: <http://www.ishmanlaw.com/resources/Respondeat_Superior.pdf> & <http://www.bu.edu/law/scitech/OLJ6.htm>.*

* cited by examiner

WORLD WIDE REPUTATION!

SELECT A PAYMENT METHOD

○ CREDIT CARD (<u>GO TO CREDIT CARD INFO PAGE</u>)

○ CHECK (<u>PERSONAL CHECK IN US FUNDS</u>)

○ MONEY ORDER

○ OTHER

WORLD WIDE REPUTATION!

— 224

CREDIT CARD INFORMATION NEEDED  ← 226

TYPE OF CREDIT CARD: | VISA | MC | AM | DISCOVER |

NAME AS IT APPEARS ON CREDIT CARD:
[_____] — 230

CREDIT CARD NUMBER:
[_____] — 232

EXPIRATION DATE:
[_____] — 234

DOLLAR AMOUNT YOU WANT TO SPEND ON YOUR BUILDING BLOCK
[_____] — 238

DO YOU WANT TO BUILD THEIR REPUTATION UP/DOWN?
○ UP
○ DOWN ← 240

CONFIRM ABOVE ANSWER:
○ UP ← 242
○ DOWN

| PRIVACY POLICY | LEGAL NOTICE | HOME | HELP | CONTACT US |

SYSTEM AND METHOD FOR RECORDING AND REPORTING CONSUMER MONETARY COMMENTARY

CROSS-REFERENCE TO RELATED APPLICATION

This application claims the benefit of U.S. Provisional Patent Application No. 60/217,980 filed Jul. 13, 2000, where this provisional application is incorporated herein by reference in its entirety.

TECHNICAL FIELD

Present invention is related generally to consumer reporting and, more specifically, to a system and method for recording and reporting consumer monetary commentary.

BACKGROUND OF THE INVENTION

Consumers who wish to purchase products or services from companies often have few resources available to determine the quality of the goods or services. Some publications provide third party reviews of products and/or services. However, such surveys and reviews are based on limited experiences with the products and/or services.

In other circumstances, consumers pass on commentary by word of mouth. For example, a consumer who enjoys a particular restaurant may provide favorable commentary about the restaurant to friends. The consumer may also pass along unfavorable commentary regarding food or service of a restaurant to friends. In both of these examples, the consumer commentary is provided by word of mouth.

In another example of existing consumer commentary using a computer network, consumers often exchange commentary via chat rooms, websites that only allow consumers to register complaints using words, email, or the like. However, the use of such commentary must be tempered with the knowledge that the consumer commentary cannot be as reliable as a consumers' reaction who is willing to spend money to build a company's reputation up or down.

Therefore, it can be appreciated that there is a significant need for a system and method for a system and method to provide reliable consumer commentary in a monetary way. The present invention provides this and other advantages as will be apparent from the following detailed description and accompanying figures.

SUMMARY OF THE INVENTION

The present invention is directed to a method and system for recording and publicly displaying consumer commentary. In one embodiment, the method comprises a technique for publicly displaying consumer commentary by communicating with a service provider at a first time to select an entity and to provide a monetary payment to the service provider to alter the reputation of the user-selected entity, and thereby build the reputation up or down. In this manner, a consumer can spend as much money as he/she wants to express the magnitude of his/her positive enthusiasm or negative disgust for any company, product or service, and then know that this will be publicly displayed. The data related to the user-selected entity is stored along with the value of the monetary payment and the user decision to build the reputation up or down.

In a typical embodiment, a plurality of different users contact the service provider to provide the monetary payments for selected entities and the decision to build the reputation of the selected entities up or down. In this embodiment, the stored data is related to a plurality of monetary payments and user decisions to build the reputation up or down for a selected entity.

In addition, consumers can contact the service provider to select an entity and retrieve stored data from the service provider related to the reputation of the user-selected entity. Stored data from the service provider related to the reputation of the user-selected entity is retrieved and the user may review the data related to the user-selected entity and the value of the monetary payment to build the reputation up or down. Thus, the user may review the decisions of previous users to provide monetary payment to the service provider to build the reputation up or down for the user-selected entity.

In one embodiment, the communication with the service provider is conducted via telephone network. Alternatively, the communication with the service provider may be performed via a computer network.

In a typical embodiment, monetary payment to the service provider may be made with a credit card. In this embodiment, monetary payment to the service provider comprises providing the service provider with appropriate credit card information. Other forms of monetary payment may also be made.

The service provider may also process the data to present it to the user in alternative formats. In one example, the stored data related to the reputation of the user-selected entity comprises graphical data, for the review of data comprises reviewing graphical data indicating the value of the monetary payment to build the reputation up or down. The method may further comprise performing statistical analysis of the stored data related to the reputation of the user-selected entity and the review of data comprises reviewing statistical data indicating the value of the monetary payment to build the reputation up or down.

DETAILED DESCRIPTION OF THE INVENTION

The present invention is directed to a technique that permits consumer commentary about a business entity, organization, product, service, person (living or historical), geographic location, and the like. For purposes of the present discussion, the various examples presented herein will refer to an "entity" as the subject of the consumer commentary. However, those skilled in the art should recognize that the term "entity" may represent any one or more of the above categories and is not limited to those specific categories expressed above. In an exemplary embodiment, the consumer commentary may be conveniently provided via a computer network. However, the present invention is not limited solely to a computer implementation. As will be described in greater detail below, the consumer may provide commentary that is monetary, not words for or against a company or product. The financial expression of that commentary, similar to a tip at a restaurant, may be a positive tip or a negative tip, depending on the consumer's experience. The position or negative tip may be used to build up or down the reputation of the user-selected entity.

Figure 1:
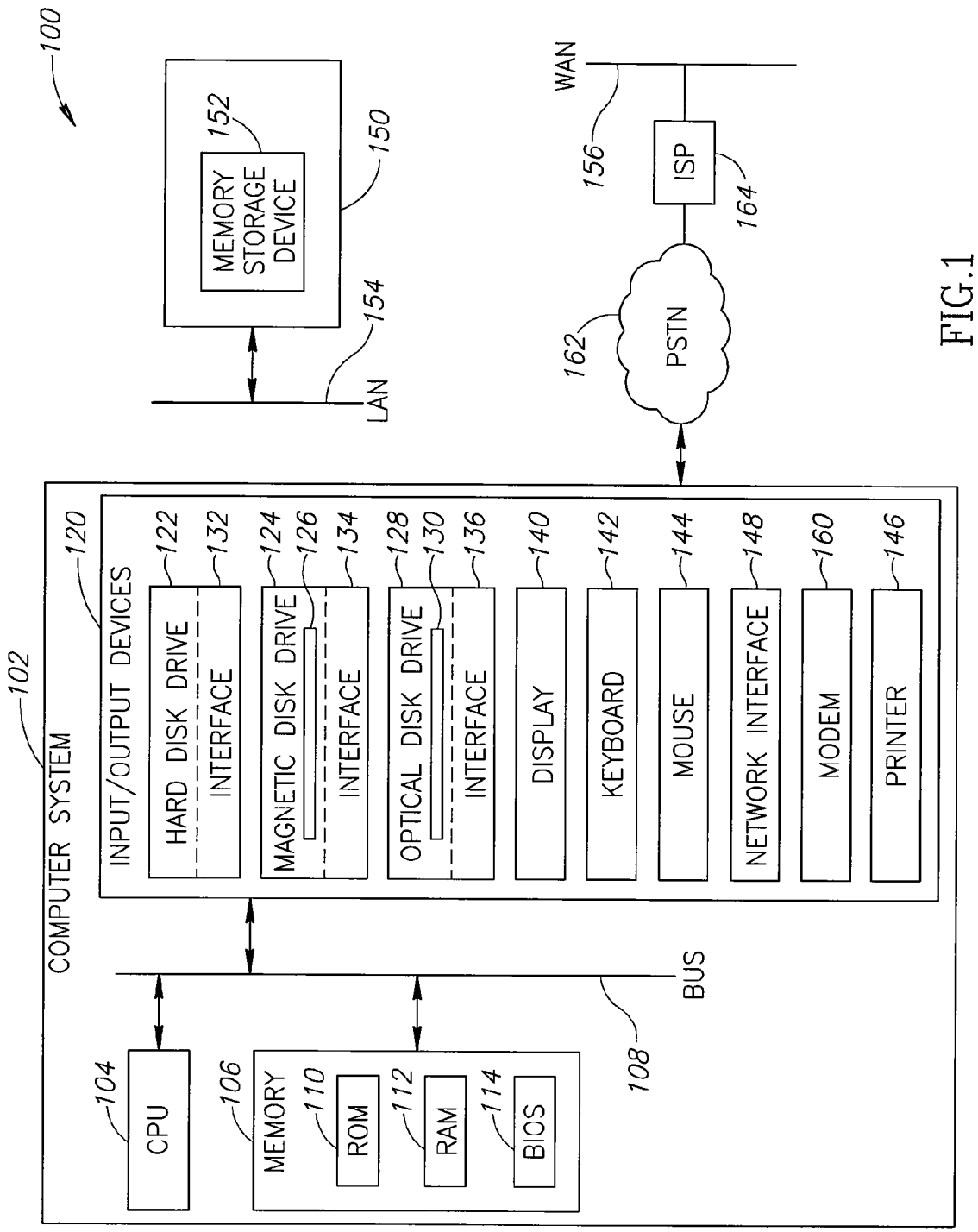
FIG. 1 is a block diagram of a computer system capable of implementation of the present invention.

FIG. 1 and the following discussion are intended to provide a brief, general description of a suitable computing environment in which the invention may be implemented. Although not required, the invention will be described in the general context of computer-executable instructions, such as program modules, being executed by the PC. Generally, program modules include hardware, as well as routines, programs, objects, components, data structures, etc. that perform particular tasks or implement particular abstract data types. The invention is implemented in a distributed computing environment where tasks are performed by remote processing devices that are linked through a communications network. In a distributed computing environment, program modules may be located in both local and remote memory storage devices.

With reference to FIG. 1, an exemplary system 100 for implementing the invention includes a general purpose computing device in the form of a conventional personal computer 102, including a central processing unit (CPU) 104, a system memory 106, and a system bus 108 that couples various system components, including the system memory 106, to the CPU 104. The system bus 108 may be any of several types of bus structures including a memory bus or memory controller, a peripheral bus, and a local bus using any of a variety of bus architectures. The system bus 108 may also include a power bus. For the sake of convenience, the various busses are illustrated in FIG. 1 as the bus system 108.

The system memory 106 includes read only memory (ROM) 110 and random access memory (RAM) 112. A basic input/output system 114 (BIOS), containing the basic routines that helps to transfer information between elements within the personal computer 102, such as during start-up, may be stored in ROM 110.

The personal computer 102 further includes input/output devices 120, such as a hard disk drive 122 for reading from and writing to a hard disk, not shown, a magnetic disk drive 124 for reading from or writing to a removable magnetic disk 126, and an optical disk drive 128 for reading from or writing to a removable optical disk 130, such as a CD ROM or other optical media. The hard disk drive 122, magnetic disk drive 124, and optical disk drive 126 are connected to the system bus 108 by a hard disk drive interface 132, a magnetic disk drive interface 134, and an optical drive interface 136, respectively. The disk drives and their associated computer-readable media provide nonvolatile storage of computer readable instructions, data structures, program modules and other data for the personal computer 102. Although the exemplary environment described herein employs a hard disk, a removable magnetic disk 126 and a removable optical disk 130, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

The personal computer 102 may also include other I/O devices 120, such as a display 140, keyboard 142, mouse 144 and printer 146. The operation of these I/O devices 120 are well-known, and need not be described in greater detail, except as it relates to the operation of the present invention. Additional I/O devices, such as a joystick, sound board, speakers and the like may be included in the personal computer 102. For the sake of brevity, these components are not illustrated in FIG. 1.

The personal computer 102 may also include a network interface 148 to permit operation in a networked environment using logical connections to one or more remote computers, such as a remote computer 150. The remote computer 150 may be another personal computer, a server, a router, a network PC, a peer device or other common network node, and typically includes many or all of the elements described above relative to the personal computer 102, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and the Internet.

When used in a LAN networking environment, the personal computer 102 may be connected to the LAN 154 through the network interface 148. When used in a WAN networking environment, the personal computer 102 typically includes a modem 160 or other means for establishing communications over the WAN 156, such as the Internet. The modem 160, which may be internal or external, permits communication with the WAN 156 via a telephone network 162, such as a public switched telephone network (PSTN). FIG. 1 illustrates the modem 156 as coupled to an Internet service provider (ISP) 164 via the PSTN 162. The ISP 164 serves as a gateway to the WAN 156, such as the Internet. It will be appreciated that the network connections shown are exemplary and other means of establishing a communications link between the computers may be used.

Figure 2:
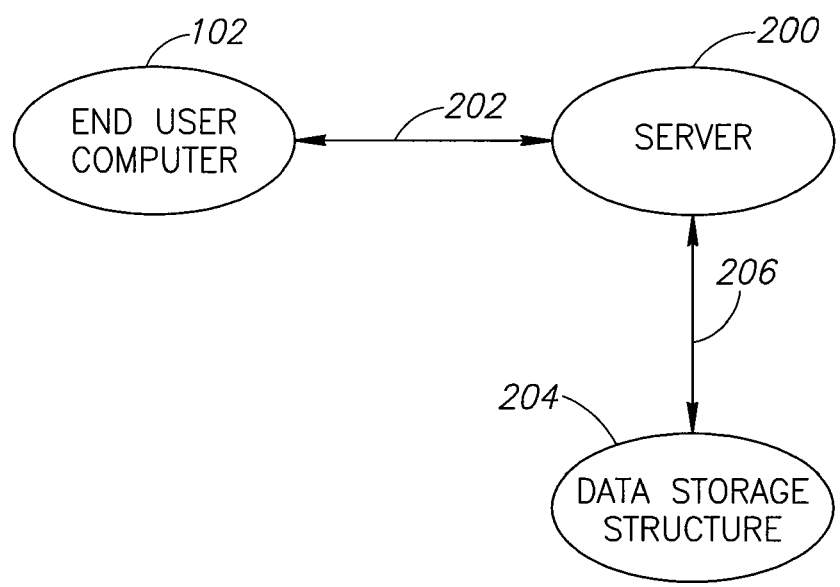
FIG. 2 is a block diagram illustrating the flow of communications between system components in a computer network implementation of the system of the present invention.

FIG. 2 illustrates the flow of communication in a sample implementation of the present invention. An end user, using a computer, such as the computer system 102, communicates with a server 200 via a communication link 202. The communication link 202 may be implemented via the LAN 154 (see FIG. 1), the WAN 156, or the like. The present invention is not limited by the specific form of the communication link 202. A data storage structure 204 is associated with the server 200 and communicates with the server via a communication link 206. The data storage structure 204 may be implemented using any convenient known form of data structure, such as a database, data table, or the like. The present invention is not limited by the specific form of the data storage structure 204. The data storage structure 204 may be an integral part of the server 200, such as a memory storage device 152 (see FIG. 1). Alternatively, the data storage structure 204 may be located remotely from the server 200 and accessible via a communication link 206, such as the LAN 154 or the WAN 156. The present invention is not limited by the specific form of the communication link 206. As will be described in greater detail below, the data storage structure 204 contains data for a number of different vendors for which customers may provide commentary in the form of positive or negative monetary amounts to build the reputation up or down for a user-selected entity.

Each entity has a reputation that can be objectively measured by consumers contributing positive or negative monetary amounts to reflect the consumer's satisfaction or dissatisfaction with the entity. With the present invention, the end user can build an entity reputation up or down by making a monetary contribution in a positive category or in a negative category, respectively.

Consumers of certain products or services can reward good service in the form of a tip. A common example of such service rewards is a restaurant in which good service is rewarded with a tip from the consumer. However, if service is poor, the consumer can leave a smaller tip or no tip at all. However, the consumer is unable to leave a "negative" tip if service is extraordinarily poor. Thus, the conventional form of tipping is limited in its ability to accurately reflect consumer satisfaction or dissatisfaction. However, with the present invention, the consumer may access the server 200 using the end user computer 102 and provide a positive or negative "tip" to register the consumer's satisfaction or dissatisfaction with the service and know that his/her tip will be publicly displayed on the internet for all other consumers to see. In the example noted above, the consumer may leave a standard tip or larger tip if a restaurant provides good service and may further reward the restaurant by providing a positive tip while accessing the server 200 thus building up the reputation of the restaurant. Conversely, the consumer may leave a smaller than standard tip or no tip at all if the restaurant service is poor. In this situation, the consumer may further access the server 200 and provide a negative tip as an expression of the user's dissatisfaction with the restaurant service thus building down the reputation of the restaurant.

In other circumstances, an entity is not subject to conventional tipping, such as discussed in the example above. However, using the system of the present invention, the consumer may still provide a positive or negative tip as a means for registering satisfaction with an entity. For example, the user may purchase a particular consumer product, such as a television set. If the user is particularly pleased with the television set, the user may express that satisfaction with a positive tip using the server 200, in a manner that will be described in further detail below thus building up the reputation of the television set. Conversely, the user may register dissatisfaction with the recently purchased television by providing a negative tip to the server 200 thus building down the reputation of the television set. As will be described in greater detail below, subsequent users may access the server 200 to review the results of other consumers' experiences with the entity. Due to the ubiquitous nature of the Internet and the ability of consumers to access the Internet worldwide, a business entity, organization, or product may have consumer ratings that may be quantifiably measured as a WORLDWIDE REPUTATION.

Figure 3:
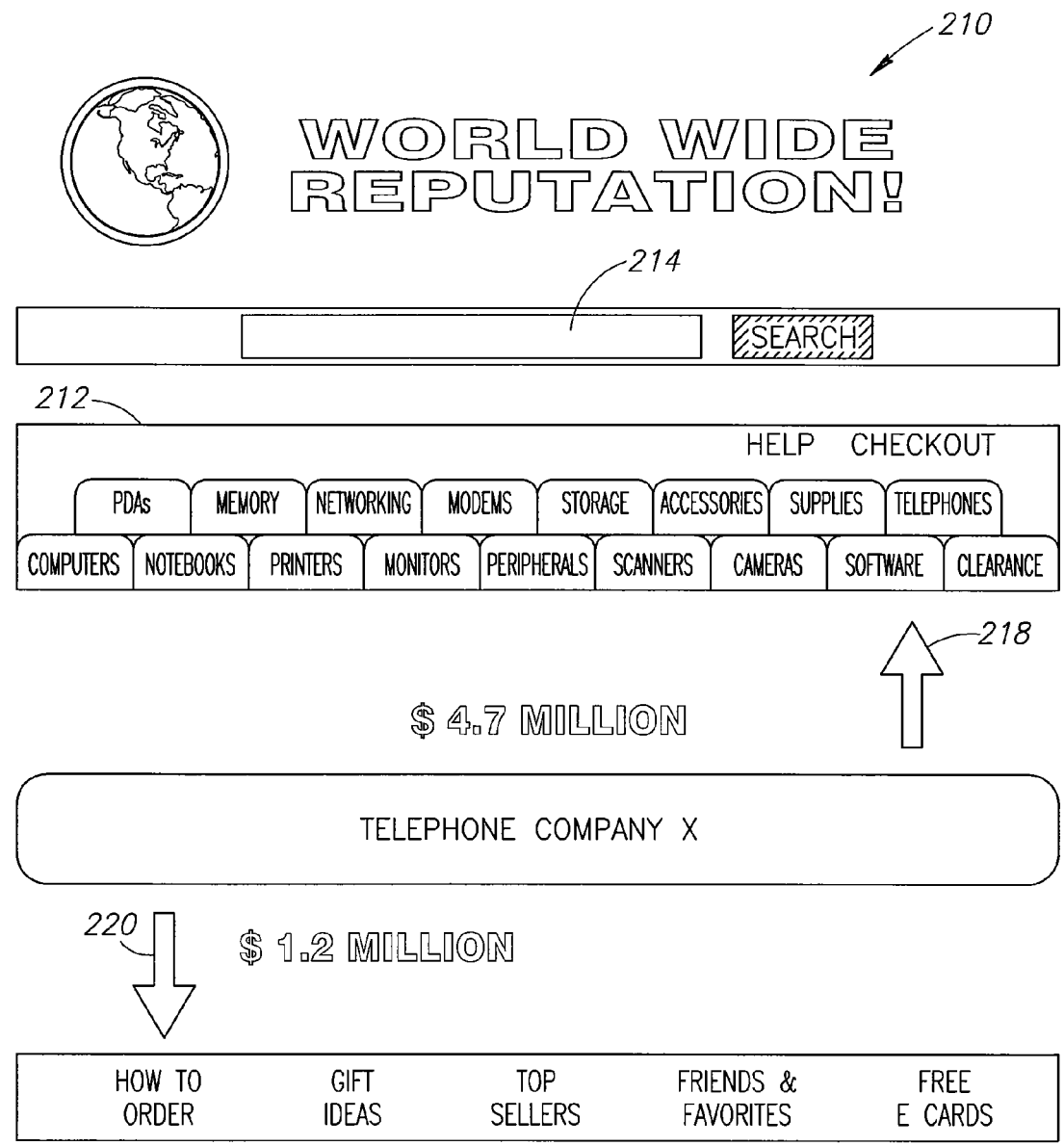
FIG. 3 is a sample screen display illustrating topics available for commentary by the consumer and the display of data requested by the consumer.

FIG. 3 is a sample screen display 210 shown on the display 140 (see FIG. 1) when the consumer accesses the server 200. As illustrated in FIG. 3, the screen display 210 has tab list 212 of different product categories. Similar tab lists (not shown) may exist for business entities and/or organizations. The user can select a product category simply by positioning the cursor (not shown) on the desired tab and clicking a button on the mouse 144, as is well known in the art. The screen display 210 also includes a search window 214 to permit the consumer to search for a desired business entity, organization or product. The search techniques used by the present invention may be readily implemented using conventional techniques, which are well known in the art and need not be described in further detail herein.

In the example illustrated in FIG. 3, consumer satisfaction results for a telephone company, designated herein as "Telephone Company X," are displayed and may be readily interpreted by the user. In the example illustrated in FIG. 3, consumers have expressed positive in Telephone Company X in the amount of $4.7 million. A graphical representation 218 may be in a first color, such as black, to graphically illustrate the positive dollar amounts for Telephone Company X while a second graphical representation 220 may be a different color, such as red, to illustrate negative dollar amounts provided by consumers. In the example illustrated in FIG. 3, Telephone Company X has $4.7 million contributed by consumers to build up the reputation of Telephone Company X and $1.2 million contributed by consumers to build down the reputation of Telephone Company X. Using this simple graphical representation, the consumer may readily determine consumer satisfaction with Telephone Company X. Although the graphical representations 218 and 220 have been described as having a particular color, the present invention may readily utilize other colors, or no colors at all (i.e., black and white). Similarly, other forms of graphical representations may be used besides the arrows illustrated in the graphical representations 218 and 220.

Figure 4:
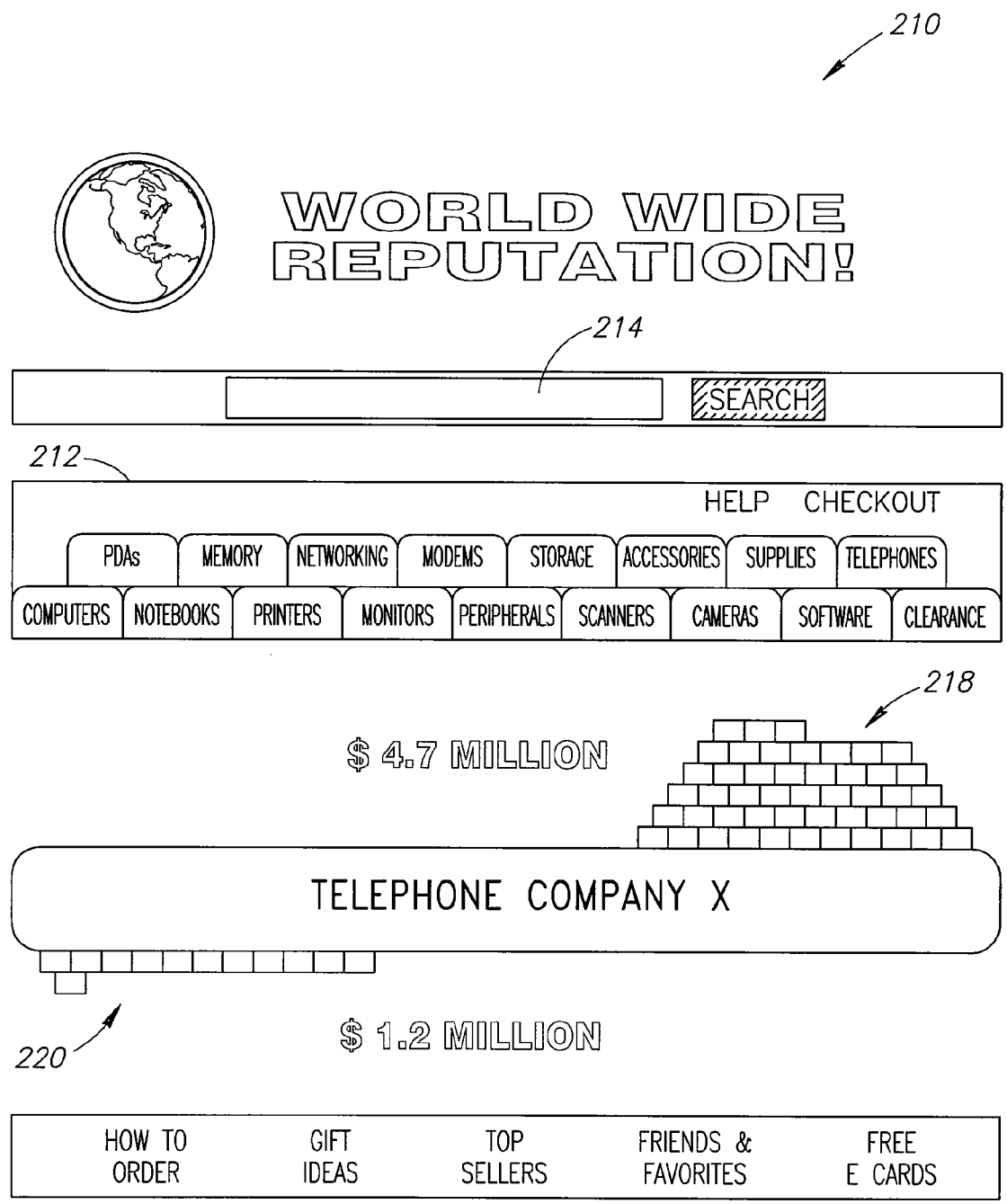
FIG. 4 is a sample screen display illustrating graphical presentation of data by the present invention.

The graphical representations 218 and 220 may also be designed to graphically illustrate the dollar amounts of positive and negative tips used to build up or down, respectively, the reputation of the entity, such as illustrated in FIG. 4. The graphical representation 218 is shown in the form of building blocks to illustrate the dollar value of contributions by consumers to build up the reputation of Telephone Company X. Similarly, the graphical representation 220 is in the form of building blocks to show the dollar value contributed by consumers to build down the reputation of the Telephone Company X. In this manner, the user may determine at a glance the positive and negative tips received by Telephone Company X and thus receive an indication of consumer satisfaction or dissatisfaction with the selected entity. The graphical representations 218 and 220 illustrated in FIG. 4 may also be provided in various colors to more readily represent the positive and negative dollar amounts.

The system 100 is implemented as an input process, in which a consumer provides a positive or negative tip based on the consumer satisfaction or dissatisfaction with an entity, thus building up or down, respectively, the reputation of the selected entity. In a second process, consumers may access the server 200 (see FIG. 2) to retrieve data and thereby determine other consumers' satisfaction/dissatisfaction with an entity. These processes will be described separately although they may be implemented in the same server 200 using the same end user computer 102, illustrated in FIG. 2.

In the data entry process, the consumer may provide a positive or negative tip using a credit card, bank card, or the like. Alternatively, the consumer may provide a positive or negative tip using other items of financial value, such as "flooz dollars," frequent flyer mileage, or the like. The advantage in requiring a financial contribution by the consumer is that the system 100 may more accurately represent consumer satisfaction/dissatisfaction with an entity if the consumer is required to support that level of satisfaction/ dissatisfaction with a financial payment.

If the user selects the credit card payment option, a hyperlink may be provided to simplify user navigation to a display screen for the entry of credit card information.

Figure 5:
FIG. 5 is a screen display illustrating additional payment options for the consumer.

FIG. 5 illustrates some of the forms of payment methods that may be available to the consumer, such as credit card, personal check, money order, or other categories, such as frequent flyer miles, AOL dollars, flooz dollars, or the like. The user manipulates the cursor (not shown) in a conventional manner to select the desired payment form and clicks a button on the mouse 144 (see FIG. 1) to select the desired payment form in a conventional fashion.

Figure 6:
FIG. 6 is a screen display illustrating credit card payment options for the consumer.

FIG. 6 illustrates a sample screen display 224 to allow the user to enter credit card information to build up or down the reputation of an entity. The consumer selects the type of credit card by selecting one of a plurality of control buttons 226 representing various credit card companies. Alternatively, the screen display 224 may contain a dropdown list (not shown) of credit card companies that may be selected in a well-known conventional manner. The user enters the name on the credit card in a name data field 230 and enters the credit card number in a number data field 232. The expiration date is entered in a date data field 234. As those skilled in the art will appreciate, sensitive financial information, such as credit card numbers, are encrypted using encryption algorithms. Such encryption algorithms are known in the art and need not be described herein.

The user enters a dollar amount that they wish to spend in a quantity data field 238 and select whether the consumer wishes to build up or down a reputation of the entity. The user selects a checkbox in a selection data field 240 to build up or down the reputation of the selected entity. The system 100 may further provide a confirmation checkbox 242 to allow the consumer to confirm the decision to build up or down the reputation for the selected entity. As those skilled in the art can appreciate, the dollar amount entered by the user in the quantity data field 238 is reflective of the level of satisfaction or dissatisfaction of the consumer with the selected entity.

As previously noted, the consumer may build a reputation up or down for various entities. In addition, consumers may build a reputation up or down for virtually any type of category. For example, the consumer may build the reputation up or down for people, including current individuals (e.g., a politician), or historical figures (e.g., Abraham Lincoln). Additionally, consumers may build up or down the reputation of geographic locations (e.g., Hawaii). In addition, the consumer may build up or down on the reputation of products such as automobiles, consumer electronics, home products, books, and the like.

The present invention, which allows the consumer to build a reputation up or down by making a financial contribution, is not limited to any specific business entity, organization, or product. Furthermore, the system 100 may be applied to services to permit the consumer to build up or down the reputation of service providers, such as health care providers, attorneys, electricians, plumbers, and the like. The system 100 operates in the manner described above to permit the consumer/user to select the desired category and provide the monetary payment to build up or down the reputation of the selected entity. The term "consumer" refers to any entity that may elect to build a reputation up or down. A consumer may be an individual, a group or organization, or a business. For example, an individual consumer can build the reputation up or down for a business (e.g., the Telephone Company X), product (e.g., a particular model television), service (e.g., the service provided by a particular plumber), geographic location (e.g., Hawaii), historical or political figure (e.g., the President of the United States), or the like. Similarly, a business can provide its own payment to build the reputation up or down in similar categories. In a business-to-business context, a business entity is a consumer when it provides payment to build the reputation of its supplier up or down. Thus, the term "consumer" is intended as a descriptive term of the entity providing payment to build a reputation up or down and is not to be interpreted as a limitation on the scope of the present invention.

Figure 7:
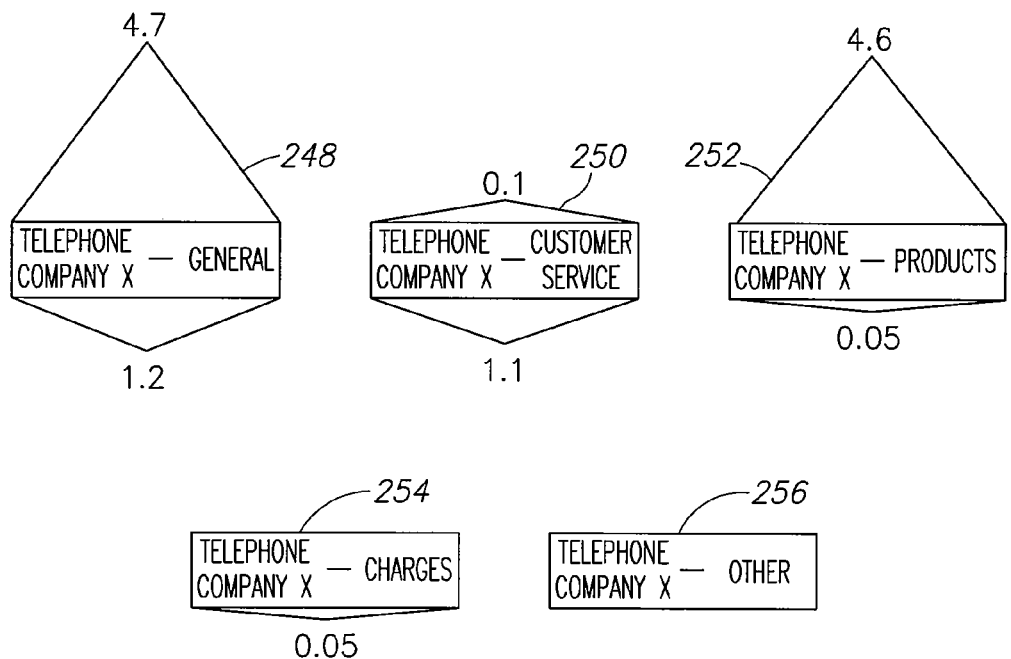
FIG. 7 is a screen display illustrating graphical presentation of various forms of consumer commentary related to a single entity.

The consumer may also build the reputation up or down for a single company using one or more categories. This concept is illustrated in FIG. 7, where results for the Telephone Company X are shown for several categories. Results of the general consumer satisfaction/dissatisfaction with the Telephone Company X are illustrated by a graphical representation 248. It should be noted that the graphical 248 is similar to the information illustrated in the example of FIG. 3. In addition to general consumer satisfaction/dissatisfaction, the consumers may build a reputation up or down for the Telephone Company X for customer service, as illustrated by a graphical representation 250, the telecommunications products of the Telephone Company X, as illustrated by a graphical representation 252, the fees charged by the Telephone Company X, as represented by a graphical representation 254, and a miscellaneous category of products/ services provided by Telephone Company X, as illustrated by a graphical representation 256.

Figure 8:
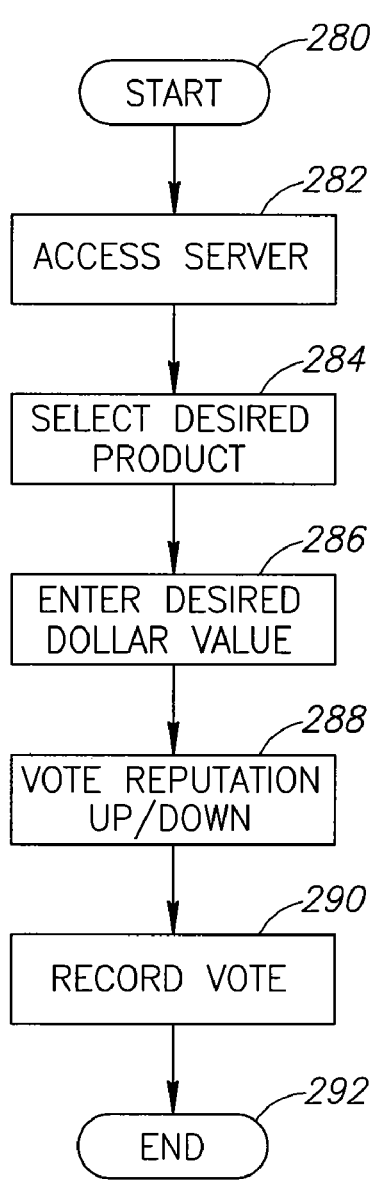
FIG. 8 is a flowchart illustrating the operation of the system to permit user commentary about a business.

The operation of the system 100 to permit the user to vote a reputation up or down is illustrated in the flowchart of FIG. 8. At a start 280, the consumer has had some experience with an entity. For the sake of clarity, the flowchart of FIG. 8 is illustrated with respect to a selected product. However, those skilled in the art will appreciate that the same process is applied for a business entity, organization, product, service, or the like. The flowchart of FIG. 8 is intended to illustrate all such operations. At step 282, the consumer accesses the server 200 (see FIG. 2) via the communication link 202. In step 284, the user selects the desired product using, by way of example, the screen displays illustrated in FIG. 3. Alternatively, the user may search for the selected product using the search window 214 in the manner described above. Because such navigation and searching techniques are well known in the art, they need not be described within the context of the flowchart of FIG. 8.

In step 286, the user enters a desired value. As previously noted, the user typically selects dollar value based on the level of satisfaction/dissatisfaction with the selected product. In step 288, the user enters data indicative of a commentary to build the reputation up or down for the selected product. In step 290, the server 200 records the monetary commentary. In a typical implementation, the data storage structure 204 is altered to reflect the recently recorded monetary commentary from the consumer. The process ends at 292. Thus, the consumer is able to easily select a desired product and register the consumer's satisfaction/dissatisfaction by building a reputation up or down and providing a monetary payment indicative of the level of satisfaction/ dissatisfaction.

The server 200 may further revise data stored in the data storage structure 204 to generate the graphical data, such as illustrated in FIG. 7, that will be provided to the consumer when retrieving data about a desired product.

As information is received from one or more consumers, the server 200 (see FIG. 2) processes the data for storage in the data storage structure 204. While the raw data itself or graphical representations thereof may be stored in the data storage structure 204, the server 200 may perform additional data processing and statistical analysis. Although not illustrated in FIG. 2, those skilled in the art understand that the server 200 also has conventional computing elements, such as the CPU 104 illustrated in the computer system 102 of FIG. 1. The CPU in the server 200 may calculate statistical data, such as the average amount of tips that consumers have made for both building up and building down the reputation. In the example of FIG. 3, where a total of $4.7 million has been expended to build up the reputation of the Telephone Company X, and $1.2 million has been expended to build down the reputation of Telephone Company X, the server 200 may generate statistics, such as the average tip, the minimum and maximum tips, total number of tips to vote up and down a reputation, and the like.

Statistical data may be particularly useful to the user in deciding whether to utilize the services of a business entity or organization, or to purchase a product or service. For example, the average monetary contribution (called a building block) to build down a reputation may be −$1.00 while the average building block to build up a reputation may be +$5.00, thus indicating a strong degree of satisfaction from consumers. Additional statistics, such as totals, may also be useful. For example, a business entity may have a total of $1,000 to build up a reputation and $1,000 to build down the reputation, which may initially appear to be a relatively neutral response by consumers. However, the total contributions may comprise 1,000 consumers each contributing to build down the reputation by choosing a −$1.00 building block, while a single consumer may have chosen to build up the reputation may have chosen to build up the reputation with a +$1,000 building block. Thus, the overall level of consumer satisfaction with a particular business entity may be quite low. The statistical data provided by the server 200 may be useful in determining the overall consumer satisfaction. Other known statistical analysis may be performed on the data stored in the data storage structure 204.

The system 100 also provides a simple retrieval process to allow consumers to look at the reputation of a business entity, organization, product, or the like. The consumer retrieves such data by accessing the server 200 in a well-known fashion, such as using the Internet. The user may select a specific company or product using the tab list 212 (see FIG. 3) or by entering data in the search window 214. If the user enters data, such as "Telephone Company X" in the search window 214, or selects "telephones" using the tab list 212, the server 200 will transmit data, such as shown in the screen display 210 of FIG. 3. As previously noted, the monetary values to build the reputation of the Telephone Company X up and down may be listed numerically, as illustrated in FIG. 3, or using graphical representations, as illustrated in FIG. 4. The screen display may also include statistical data, such as discussed above.

The system 100 also permits the user to enter different forms of search criteria in the search window 214 (see FIG. 3). As previously noted, the user may enter a company name, organizational name or product name. However, the user may also search using other criteria, such as geographic area. For example, one consumer may be interested in the reputation of a national known entity, such as a hotel. The consumer may enter the name of the hotel chain in the search window 214 in the manner described above. However, another consumer may not be interested in the overall response of consumers to the nationwide chain but is only interested in consumer response for a specific location, such as a hotel located in Miami, Fla. By entering geographical search terms, this consumer may limit the retrieval of information from the server 200 to the user-specified geographic area.

Other search criteria, such as dollar amounts used to build up or down a reputation may also be used as a search criteria. For example, the consumer may wish to select a hotel in Miami. The consumer may not want consumer feedback on a specific hotel or hotel chain, but can search for hotels whose overall reputation exceeds a user-specified dollar limit for consumers that have built up the reputation of the hotel. For example, the consumer can specify, using various search criteria, a hotel whose reputation has been built up above a certain threshold (e.g., greater than $1,000) or whose positive reputation exceeds the negative reputation by a predetermined dollar amount (e.g., greater than $2,000). In this manner, the user may retrieve a list of hotels in the Miami area whose reputation has been built up by consumers above the user-specified thresholds.

Figure 9:
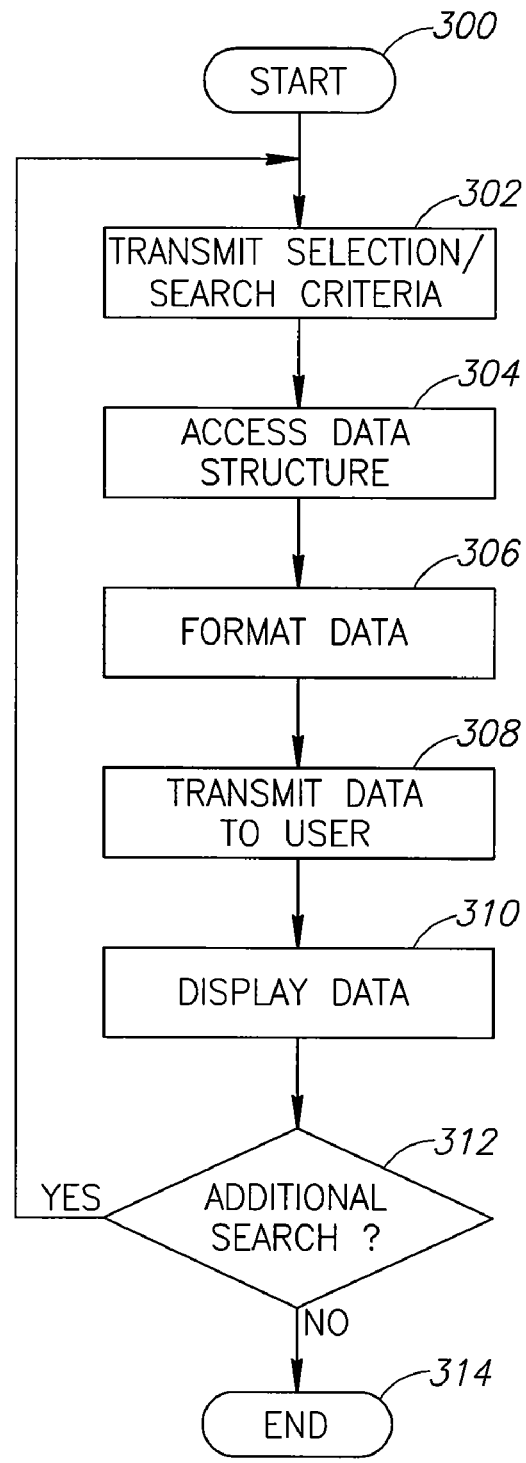
FIG. 9 is a flowchart illustrating the operation of the system to permit a consumer to retrieve commentary about a business.

The process of retrieving and displaying data from the server 200 (see FIG. 2) is illustrated in the flowchart of FIG. 9 where, at a start 300, it is assumed that the user is coupled to the server 200 via the communication link 202. In step 302, the user transmits selection/search criteria to the server 200. As discussed above, the selection criteria may be entered by the keyboard 142, the mouse 144, or other conventional input device on the computer system 102. The present invention is not limited by the specific form of the input device used to enter the user-entered selection criteria. The user may also enter search criteria using, by way of example, the keyboard 142 to enter a search term into the search window 214 (see FIG. 3). The search term may be entered separately from the selection criteria or in conjunction with the selection criteria. Such combinations are within the scope of one of ordinary skill in the art and need not be described in greater detail herein. For example, the user may select hotels using the tab list 212 and may enter a search term, such as a geographical search term or a specific hotel chain, using the search window 214. As those skilled in the art can appreciate, step 302 may be repeated multiple times to provide the desired level of selection/search criteria. For example, as noted above, the user may be interested in a particular hotel chain in Miami or may be interested in any hotel in Miami whose reputation has been voted up by a user-selected threshold. Step 302 is intended to illustrated the entry of any and all selection in the search criteria that may be entered by the user.

In step 304, the server 200 accesses the data storage structure 204 using the communication link 206. The server 200 can search the data storage structure 204 in a conventional manner to extract data based on the transmitted selection/search criteria. Thus, the data storage structure 204 provides data to the server 200 based on the user-specified criteria. In step 306, the server formats the retrieved data for subsequent display to the user in the most useful manner. In one embodiment, the data may be formatted using conventional language, such as hypertext markup language (HTML) for convenient transmission to the user via a network, such as the Internet. Those skilled in the art will appreciate that other data forms may also be used to format the data received from the data structure 204. The data may be graphical data, as noted above, or statistical representations of data provided by the server 200.

In step 308, the server 200 transmits the formatted data to the user. In the example illustrated in FIG. 2, the user operates the end user computer 102 and receives the data from the server 200 via the communication link 202. In step 310, the end user computer 102 displays the data on the display 140 (see FIG. 1).

In decision 312, the system 100 determines whether the user wishes to enter additional selection/search criteria. For example, as noted above, the user may select hotels in a first search and then, using additional searches, select a geographic location or perform additional searching based on monetary thresholds for the reputation of a specific business entity or of all business entities in a selected industry, such as hotels. The present invention is not limited by the number or type of searches that may be performed. If additional searches are requested, the result of decision 312 is YES and the system returns to step 302 to transmit the additional selection/search criteria to the server 200 (see FIG. 2). If no additional searches are requested, the result of decision is NO and the system ends the process at 314. Thus, the system 100 provides a convenient mechanism for the user to build the reputation up or down for any business entity, organization, or product, services, and the like. In addition, as noted above, the system can be used to build a reputation up or down for people, either living people or historic figures, or places. As noted above, the present invention is not limited by the specific "thing" whose reputation is being built up or down by monetary contributions. Furthermore, the present invention is not limited by the specific "thing" providing the contribution to build the reputation up or down. In some situations, the consumer is an individual while the consumer is a business entity in a business-to-business context.

Although the examples presented above have been primarily directed to a computer implementation in which data is provided to the server 200 (see FIG. 2) or retrieved from the server via a network (such as the Internet), the system 100 may be implemented in a variety of different ways, some of which do not require a computer at all. For example, the Internet or email may be utilized to enter and retrieve data from the server 200. Alternatively, data may be entered and retrieved from a service provider company storing such data using other conventional techniques, such as telephone, facsimile, and conventional mail. In a telephone embodiment, the consumer may provide feedback using a telephone by calling, by way of example, a toll free telephone number for the service provider implementing the present invention. The consumer may provide credit card information and the like to a customer service agent by telephone. In addition, other information, such as the business entity, organization, product, or the like, may also be provided to the customer service agent by telephone. The customer service agent enters the appropriate data into a computer, such as the server 200, for subsequent storage in the data storage structure 204. In this manner, the consumer has conveniently provided the necessary information and made a monetary payment to build up or down the reputation of a user-selected entity.

In a data retrieval mode, the consumer may contact the service provider implementing the present invention using the same phone number or a different phone number provided for data retrieval. The consumer may request data about a particular business entity, organization, product, service, or the like. A customer service agent responds to the request by entering data into a computer, such as the server 200 (see FIG. 2) to retrieve the requested data from the data storage structure 204. The retrieved data may be provided to the consumer verbally over the telephone, sent via facsimile, email, conventional mail, or the like. The service provider implementing the present invention may charge a nominal fee for such data retrieval requests. In an Internet implementation, the service provider implementing the system 100 may also charge a nominal fee. Alternatively, advertisers may provide advertising on the computer display to offset the cost of providing the service.

In yet another implementation, a consumer may build a reputation up or down via facsimile by filling out a pre-printed form (not shown) or by simply preparing a letter and providing the necessary financial data, such as a credit card number, expiration date, signature and the like. The information to build a reputation up or down may be provided by facsimile or conventional mail. Similarly, a consumer may retrieve data from a service provider implementing the present invention by facsimile or conventional mail. The necessary selection/search criteria must be provided in the facsimile or letter to enable the service provider implementing the invention to retrieve the requested data. The requested data may be retrieved in the manner described above and provided to the user via facsimile or conventional mail. Thus, the present invention allows individuals to express their satisfaction/dissatisfaction on virtually any topic in a monetary form for their choice to build a reputation up or down. The amount used to build a reputation up or down typically reflects the degree of satisfaction or dissatisfaction that the individual experienced. Similarly, information may be retrieved by a user to simply measure public opinion, such as public satisfaction with a political figure. However, the system of the present invention is also useful for selection of products or services. For example, the user may retrieve data about plumbers in a selected geographical area and select a plumber based on consumer satisfaction/dissatisfaction with a particular plumber. The same principles may be applied to the selection of other products or services. The present invention is not limited by the specific form in which data is provided to the service provider implementing the presentation or retrieved from the service provider.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for consumer recording and publicly reporting monetary commentary using a commentary reporting service, the method comprising:
 receiving an entity selecting electronic communication from each of a plurality of data inputting users different from the commentary reporting service in which the data inputting user selects an entity from a plurality of entities different from the commentary reporting service and the user;
 for each of the data inputting users:
  providing a positive rating category and a negative rating category for the data inputting user-selected entity;
  receiving user selection input from the data inputting user to select either the positive rating category or the negative rating category for the data inputting user-selected entity;
  receiving user selection input from the data inputting user of an amount for a monetary contribution; and
  receiving the monetary contribution to the commentary reporting service from the data inputting user in the data inputting user selected amount;

aggregating the monetary contribution from the data inputting user with the monetary contributions from other data inputting users for the data inputting user-selected entity according to the rating category selection of the data inputting user;

building a monetary commentary of data inputting user satisfaction or dissatisfaction with the data inputting user-selected entity by performing statistical analysis upon the monetary contributions associated with the positive rating category and the monetary contributions associated with the negative rating category by the plurality of data inputting users, the statistical analysis comprising one of:

totaling the monetary contributions associated with the positive rating category;

totaling the monetary contributions associated with the negative rating category;

totaling the monetary contributions associated with the positive rating category and the monetary contributions associated with the negative rating category;

averaging the monetary contributions associated with the positive rating category;

averaging the monetary contributions associated with the negative rating category;

averaging the monetary contributions associated with the positive rating category and the monetary contributions associated with the negative rating category;

determining a minimum monetary contribution associated with the negative rating category;

determining a maximum monetary contribution associated with the negative rating category;

determining a maximum monetary contribution associated with the positive rating category; and determining a minimum monetary contribution associated with the positive rating category;

and the statistical analysis further comprising:

determining a number of monetary contributions associated with the positive rating category; and determining a number of monetary contributions associated with the negative rating category;

in a computer associated with the commentary reporting service, storing data related to monetary commentary for the data inputting user-selected entity;

receiving an electronic communication from a data reviewing user to select an entity from among the plurality of entities;

in response to the electronic communication from the data reviewing user, retrieving stored monetary commentary data related to the data reviewing user-selected entity; and indicating the monetary commentary data related to the data reviewing user-selected entity.

* * * * *